Patented Jan. 7, 1947

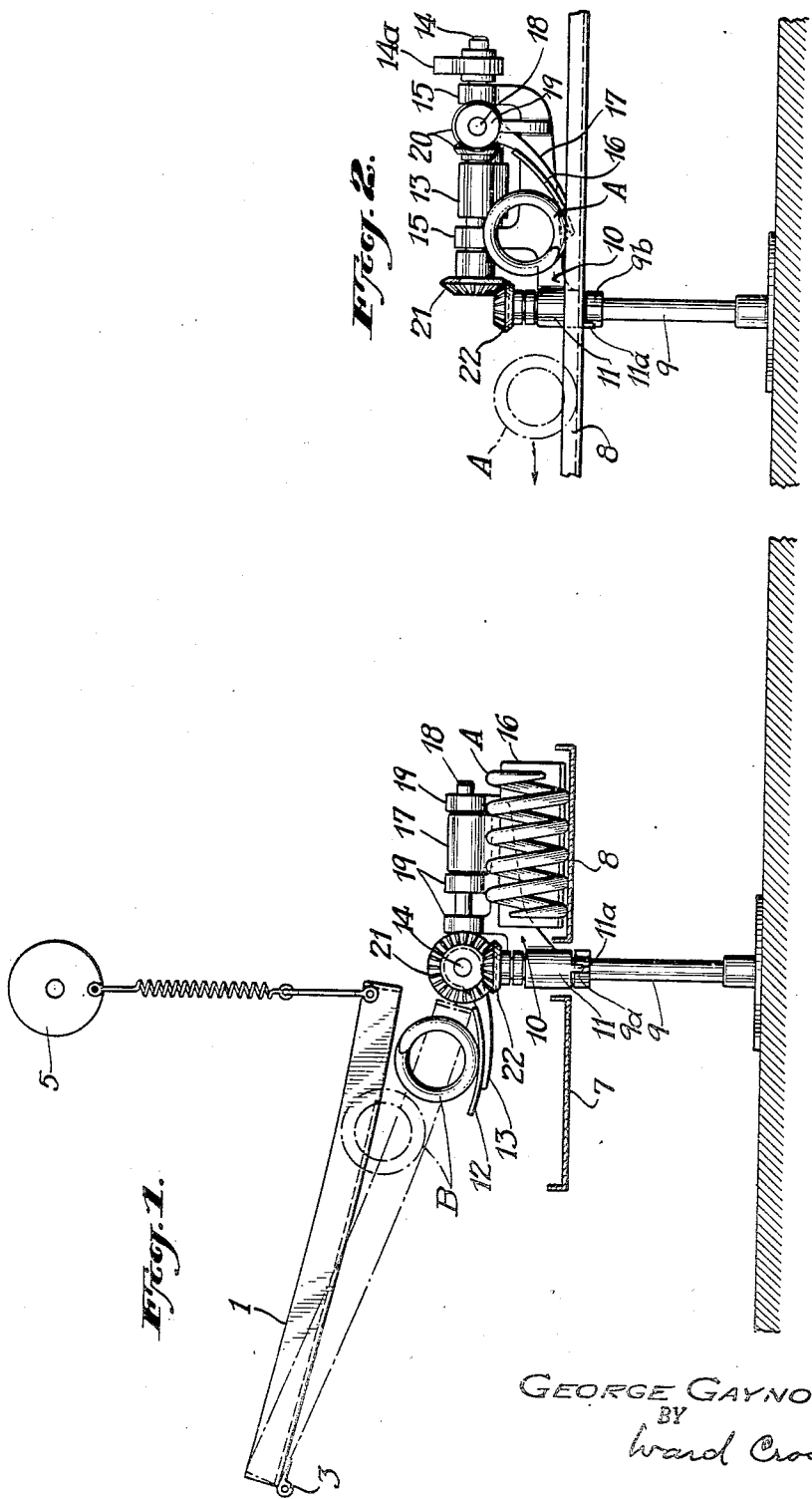

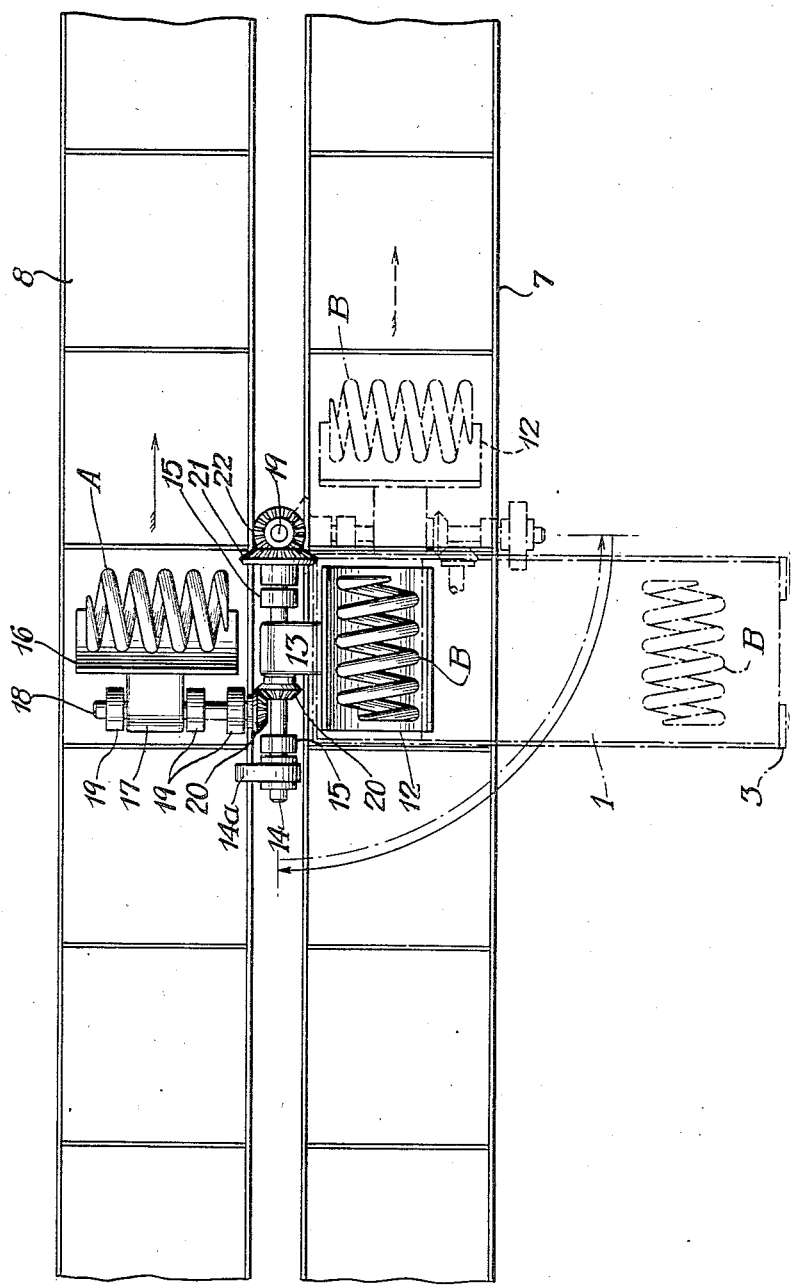

2,413,767

UNITED STATES PATENT OFFICE 2,413,767

CONVEYER MECHANISM

George Gaynor Hyde, Darien, Conn., assignor to Crucible Steel Company of America, New York, N. Y., a corporation of New Jersey Application October 17, 1944, Serial No. 559,081

3 Claims. (Cl. 198—27)

The invention aims to provide transfer mechanism wherein the power for the necessary movements between article-receiving and article-discharging positions is supplied by the weight of the articles themselves to the end that when the articles to be transferred are fed to the mechanism in properly timed sequence, the mechanism will operate automatically without need of outside mechanical power.

In its more specific aspects the invention comprehends a transfer mechanism wherein the weight of articles received by or deposited thereon will cause such articles to be properly transported and delivered, and at the same time cause the mechanism to be properly repositioned to receive and deliver the next article fed to it. In its preferred form the mechanism is so constructed that as one part thereof is moving from article-receiving to article-delivering position, the weight of the article being thus transferred will cause another part of the mechanism to be restored from article-delivering to article-receiving position, the weight of successively fed articles thereby causing the mechanism to repeat its cycle of operation so long as the articles continue to be fed to it at the proper times.

The mechanism may be readily constructed to deliver the articles in a position at an angle to the position in which they are received by the mechanism.

Further objects and advantages of the invention will be in part obvious and in part specifically referred to in the description hereinafter contained which, taken in conjunction with the accompanying drawings, discloses a preferred form of apparatus constructed to operate in accordance with the invention. Such apparatus, however, should be considered as merely illustrative of the principles of the invention in its broader aspects. In the drawings—

Fig. 1 is an elevation of one form of apparatus constructed to operate in accordance with the invention, looking from the right as the apparatus appears in Fig. 3.

Fig. 2 is a side elevation of the transfer mechanism proper as it appears from the right hand side of Fig. 1.

Fig. 3 is a plan view of the transfer mechanism shown in Figs. 1 and 2.

The particular form of apparatus shown in the drawings is constructed to receive articles which are successively fed to the transfer mechanism proper by appropriate feed mechanism such as the chute 1 which is pivoted at point 3, and appropriately arranged to deliver the articles successively at the proper times, as indicated schematically by the rotary crank arm 5 at the top of Fig. 1. The particular transfer mechanism which is illustrated, functions to receive the articles fed to it by chute 1, turn them through an angle of 90° and then deliver them onto a traveling conveyer 7 which moves in a direction at right angles to chute 1. Also the transfer mechanism functions similarly (and alternately) to receive articles from the chute 1 and deliver them to a traveling conveyer 8 located alongside conveyer 7. The articles handled by the mechanism may be any of sufficient weight to actuate it, and capable of rolling or sliding movement as required during operation. The illustrated articles are heavy cylindrical coil springs, such as are used in railway car construction.

The illustrated form of transfer mechanism is provided with a stationary post 9 about which the remainder of the transfer mechanism is angularly movable. As shown the remainder of the transfer mechanism is carried by a frame 10 having a collar 11 which rotatably surrounds the post 9. An article receptor 12, shown in the form of a tray appropriately shaped to receive articles fed to it from chute 1, is fastened by a supporting arm 13 to a shaft 14 which is journaled in appropriate bearings 15 extending upwardly from the frame 10.

Another similar receptor 16 is fastened by an arm 17 to a shaft 18 likewise journaled in bearings 19 extending upwardly from frame 10. The shafts 14 and 18 are appropriately coupled together, as by means of the bevel gears 20 which appear in Fig. 3, and the shaft 14 also has fixed to it a bevel gear 21 which meshes with a stationary gear 22 on the post 9.

In the position of the parts shown in the drawings a spring A (see Figs. 2 and 3) is just being delivered onto conveyer 8 by receptor 16, and a spring B has just been deposited onto the receptor 12 from chute 1, the receptor 12 being thus in receiving position and the receptor 16 in discharging position. The weight of spring B on receptor 12 causes the latter to tilt downwardly about the axis of shaft 14, thus rotating the shaft 14 whereupon the gear 21 by engagement with the stationary gear 22 rotates the frame 10 and the receptors carried thereby about the post 9 as an axis. The receptor 12 accordingly swings anti-clockwise thru an arc about 90° from the position shown by the full lines in Fig. 3, and at the same time tilts downwardly under the weight of the spring B, until by the time the position indicated by the dotted lines in the lower right hand corner of Fig. 3 has been reached, receptor 12 has been tilted far enough to discharge spring B onto the conveyer 7. Thus the angular position of the spring as delivered is at an angle of about 90° to the position in which it was received from chute 1, and the spring is delivered at a lower level.

While the receptor 12 has been tilting downwardly as above described, the gears 20 cause the shaft 18 to be rotated in a direction which shifts the receptor 16 from the discharging position shown in the drawings to an upper position ready to receive the next successive spring discharged from chute 1, the receptor 16 being also swung horizontally through an arc of about 90° during its upward tilting movement. When the spring B has been discharged from receptor 12, the weight of the next successive spring delivered from chute 1 onto receptor 16 will tilt the latter downwardly as has been above described in connection with the receptor 12, whereupon gears 20, 21 and 22 will cause the receptors to swing clockwise back to the positions shown in Fig. 3, thereby restoring the receptor 12 to article-receiving position, and returning the receptor 16 to article-delivering position.

Thus in the particular form of apparatus above described the counter weight of one spring upon its corresponding receptor supplies the energy which is needed to restore the other receptor to article-receiving position, and the weight of the article also causes its own receptor to move automatically to article-discharging position.

The disclosed form of apparatus also includes an eccentric weight 14a which is shown as carried by the shaft 14, and which is so positioned that its weight will complete the downward movement of the trays 12 and 16 to delivering position in case the articles carried by the trays should be delivered before the latter have moved fully to the delivery position as shown in Fig. 2 in respect to the tray 16. Suitable stop means such as the leg 11a on collar 11 engaging the shoulder 9a (Fig. 1) and shoulder 9b (Fig. 2) at the respective limits of angular movement of frame 10, may also be provided to insure that frame 10 does not over-travel in its oscillating movements.

While the invention has been disclosed as carried out by the particular form of apparatus above described, it should be understood that many changes may be made without departing from the principles of the invention in its broader aspects within the scope of the appended claims.

I claim:

1. A transfer mechanism of the class described, including a stationary support, a frame mounted for angular movement about a vertical axis with respect to said support, a receptor mounted for downward tilting movement about a horizontal axis with respect to said frame under the weight of an article fed to said receptor, and means acting between said receptor and its support whereby said tilting movement of said receptor will produce said angular movement of said frame and receptor with respect to said support.

2. A transfer mechanism of the character described comprising a stationary support, a frame mounted for angular movement about a vertical axis with respect thereto, a plurality of receptors mounted for downward movement about a horizontal axis with respect to said frame under the weight of articles fed successively to said receptors, means inter-connecting said receptors whereby said downward movement of one receptor will produce upward movement of the other, and means whereby the respective downward movements of said receptors will produce said angular movements in opposite directions of said frame and receptors with respect to said support.

3. A transfer mechanism of the character described, including a stationary substantially vertical supporting post, a frame mounted for substantially horizontal angular movements with respect to said posts, a plurality of receptors pivotally carried by said frame to afford downward tilting movements of said receptors under the weight of articles fed thereto, gearing connecting said receptors to produce upward tilting movement of one receptor when the other receptor tilts downwardly, and gearing acting between said receptors and said post for producing angular movement of said frame and receptors upon the occurrence of the aforesaid tilting movements, means being provided for feeding articles successively to said receptors.

GEORGE GAYNOR HYDE.